Patented Dec. 18, 1928.

1,696,034

UNITED STATES PATENT OFFICE.

HAROLD GROSSMAN, OF CALDWELL, NEW JERSEY, ASSIGNOR OF ONE-FOURTH TO WILLIAM S. PRITCHARD, OF NEW YORK, N. Y.

PROCESS FOR PRODUCING OILED PIGMENTS.

No Drawing.  Application filed February 25, 1927. Serial No. 171,073.

According to present methods of manufacturing pigments or lake colors, the finished pigment, which is in very fine particles, has to be washed in water at one stage of the process. When it is washed the pigment forms a pulp. The moisture is then removed from the pulp by drawing off the supernatant water, filter-pressing the remaining pulp and then drying the filtered cake. The cake is then ground, but it is difficult to grind it into as fine particles as before. The pigment in this form is sold to the paint manufacturer who grinds it further in oil to form the paint, this grinding being necessary to obtain the desired degree of fineness.

It is the object of my invention to provide a novel and improved method which shall avoid the necessity of further grinding and which will result in a pigment mixed with oil and having its original degree of fineness. A further object is to separate the pigment from the water without the necessity of using filters or the like at this stage. According to my invention I preferably start with the unused pigment in aqueous solution. At one stage of the manufacture of pigment it is in suspension in such a solution and that stage forms a convenient one at which to practise my invention.

The suspension at this stage will contain acids or salts and these I preferably use in performing one of the steps of my method. I first form an emulsion of oil in water, using a protein or other protective colloid in colloidal solution. This emulsion is then added to the suspension and when it is added the emulsion will be broken by the acids or salts in the suspension. Breaking of the emulsion is caused by coagulation of the protein and as soon as the emulsion is broken the pigment is transferred to the oil because of its preference therefor and will settle very rapidly.

The supernatant water may then be drawn off and the pigment rolled or treated in any other suitable way to remove any moisture adhering to the oiled particles of pigment. The result will be that each of the original particles of pigment will be separately wetted with oil and therefore the pigment will retain its original degree of fineness, so that the pigment is now ready for use without further grinding.

The probably correct theory is that the particles of oil in the emulsion are covered with a thin layer of the protective colloid, this layer probably being mono-molecular. When in this condition the colloid has a very low surface tension, but when it is coagulated this tension is greatly increased, thus decreasing the specific surface and causing the layer of colloid to break, thus releasing the oil. The pigment prefers the oil to the water and will be transferred thereto. However, it is to be understood that I do not intend to limit myself by the above theory;.

The protective colloid with which I form the emulsion is preferably a protein such as casein. Other protective colloids which are capable of being coagulated may be employed.

If desired the pigment may be washed and then be submitted to the above method. In that case it will be necessary to first add the emulsion to the washed pigment and then to add a coagulating medium such as a salt or acid to coagulate the colloid and to break the emulsion. Otherwise there need be no change in the method.

The protein may be dissolved in a suitable solvent such as sodium secondary phosphate, this being a particularly suitable solvent for casein. Other solvents will suggest themselves to those skilled in the art.

Another way in which the invention may be expressed is to say that I form a sol with which I then emulsify the oil. The sol is then converted to a gel in order to break the emulsion and release the oil.

The gist of my invention resides in coagulating the colloid with which the oil emulsion is formed, after the emulsion is added to the pigment suspension. The coagulating of the protein may be done by using a coagulating medium which will render the colloid neutral, although colloids may be used which will not be neutralized by the coagulating media used therewith.

While I have described a certain method for practising my invention, this method is given merely as an illustration and I do not intend to limit myself thereby. Other equivalent methods will suggest themselves to those skilled in the art and I therefore intend to limit myself only by the appended claims.

I claim:

1. The method of producing oiled pigments which comprises forming an emulsion of oil with a protective colloid, adding the emulsion to the pigment, and coagulating the colloid to break the emulsion and release the oil.

2. The method of producing oiled pigments which comprises forming an emulsion of oil with a protective colloid, adding the emulsion to the pigment, coagulating the colloid to break the emulsion and release the oil, and preferentially wetting the pigment with the oil.

3. The method of producing oiled pigments which comprises forming an emulsion of oil with a protective colloid and adding the emulsion to a pigment in suspension in a coagulating medium, thereby causing coagulation of the colloid.

4. The method of producing oiled pigments which comprises forming an emulsion of oil with a protective colloid, adding the emulsion to a pigment in suspension in a coagulating medium, thereby causing coagulation of the colloid to break the emulsion, and preferentially wetting the pigment with the oil released by breaking the emulsion.

5. The method of producing oiled pigments from pigment in suspension in a liquid which comprises adding to the suspension an emulsion of oil with a protective colloid and coagulating the colloid.

6. The method of producing oiled pigments from pigment in suspension in a liquid which comprises adding to the suspension an emulsion of oil with a protective colloid, coagulating the colloid to break the emulsion and release the oil, and preferentially wetting the pigment with the oil thus released.

7. The method of producing oiled pigments which comprises forming an emulsion with a protein, adding the emulsion to the pigment, and coagulating the protein to break the emulsion and release the oil.

8. The method of producing oiled pigments which comprises forming an emulsion with a protein, adding the emulsion to the pigment, coagulating the protein to break the emulsion and release the oil, and preferentially wetting the pigment with the oil thus released.

9. The method of producing oiled pigments which comprises forming an emulsion with a protein in colloidal solution, adding the emulsion to the pigment, coagulating the protein to break the emulsion and release the oil, and preferentially wetting the pigment with the oil thus released.

10. The method of producing oiled pigments which comprises forming an emulsion of oil with casein, adding the emulsion to the pigment, and coagulating the casein to break the emulsion and release the oil.

11. The method of producing oiled pigments which comprises forming an emulsion of oil with casein, adding the emulsion to the pigment, coagulating the casein to break the emulsion and release the oil, and preferentially wetting the pigment with the oil thus released.

12. The method of producing oiled pigments which comprises forming an emulsion of oil with casein in colloidal solution, adding the emulsion to the pigment, and coagulating the casein to break the emulsion and release the oil.

13. The method of producing oiled pigments from pigment in suspension in a liquid which comprises adding to the suspension an emulsion of oil with a protective colloid which will be coagulated by said liquid.

14. The method of producing oiled pigments which comprises forming a sol, emulsifying oil with the sol, adding the emulsion to the pigment, and converting the sol to a gel to break the emulsion and release the oil.

In testimony whereof, I have affixed my signature to this specification.

HAROLD GROSSMAN.